US012578256B2

(12) United States Patent (10) Patent No.: US 12,578,256 B2
Yang et al. (45) Date of Patent: Mar. 17, 2026

(54) MULTIWAVELENGTH PHOTOELECTRIC SMOKE DETECTION APPARATUS AND METHOD

(71) Applicant: ELECTRONICS AND TELECOMMUNICATIONS RESEARCH INSTITUTE, Daejeon (KR)

(72) Inventors: Hoe-Sung Yang, Daejeon (KR); Kang Bok Lee, Daejeon (KR); Kwang-Soo Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 130 days.

(21) Appl. No.: 18/400,221

(22) Filed: Dec. 29, 2023

(65) Prior Publication Data

US 2024/0230503 A1    Jul. 11, 2024

(30) Foreign Application Priority Data

Jan. 10, 2023    (KR) ........................ 10-2023-0003321

(51) Int. Cl.
*G01N 15/075* (2024.01)
*G01N 15/00* (2024.01)
*G08B 17/107* (2006.01)

(52) U.S. Cl.
CPC ......... *G01N 15/075* (2024.01); *G08B 17/107* (2013.01); *G01N 2015/0046* (2013.01)

(58) Field of Classification Search
CPC ......... G01N 15/075; G01N 2015/0046; G08B 17/107
See application file for complete search history.

(56) References Cited

U.S. PATENT DOCUMENTS

| | | | |
|---|---|---|---|
| 9,098,989 B2 | 8/2015 | Fischer | |
| 2013/0238138 A1 | 9/2013 | Cole et al. | |
| 2014/0169389 A1 | 6/2014 | Kim et al. | |
| 2014/0178069 A1 | 6/2014 | Kim et al. | |
| 2014/0197957 A1* | 7/2014 | Fischer | G08B 17/107 340/630 |

(Continued)

FOREIGN PATENT DOCUMENTS

| | | |
|---|---|---|
| CN | 2914067 Y | 6/2007 |
| JP | 6470558 B2 | 2/2019 |

(Continued)

*Primary Examiner* — Michelle M Iacoletti
*Assistant Examiner* — Jarreas Underwood
(74) *Attorney, Agent, or Firm* — Rabin & Berdo, P.C.

(57) ABSTRACT

Provided are a multiwavelength photoelectric smoke detection apparatus and method, which reduce non-fire alerts by distinguishing smoke caused by actual fire occurrence and non-fire smoke occurring in daily life when a suspected fire event occurs. The multiwavelength photoelectric smoke detection apparatus includes a chamber in which a smoke inlet is formed, a light emitter for generating light with multiple wavelengths, a light receiver for detecting scattered light due to smoke particles, a controller for turning a light source of the light emitter on and off and detecting a scattered light signal from the light receiver, and a fire determination part for determining whether an amplitude of the detected scattered light signal exceeds a threshold value and generating an alarm.

13 Claims, 10 Drawing Sheets

100

(56)          References Cited

U.S. PATENT DOCUMENTS

| 2017/0213434 A1* | 7/2017 | Bressanutti | G08B 17/113 |
| 2020/0265697 A1* | 8/2020 | Gao | G08B 17/113 |
| 2020/0363312 A1* | 11/2020 | Deliwala | G01N 15/1434 |
| 2022/0082512 A1* | 3/2022 | Van Mechelen | G01J 1/02 |
| 2022/0268682 A1* | 8/2022 | Chu | G08B 17/107 |
| 2024/0233516 A1* | 7/2024 | Yang | G08B 29/145 |

FOREIGN PATENT DOCUMENTS

| KR | 101963111 B1 | 7/2019 |
| KR | 102275994 B1 | 7/2021 |
| KR | 20210087909 A | 7/2021 |
| KR | 102352201 B1 | 1/2022 |

* cited by examiner

<u>100</u>

$$\theta = \frac{360°}{m}$$

MULTIWAVELENGTH PHOTOELECTRIC SMOKE DETECTION APPARATUS AND METHOD

CROSS-REFERENCE TO RELATED APPLICATION

This application claims priority to and the benefit of Korean Patent Application No. 10-2023-0003321, filed on Jan. 10, 2023, the disclosure of which is incorporated herein by reference in its entirety.

BACKGROUND

1. Field of the Invention

The present invention relates to a smoke detection technology, and more particularly, to a technology for determining whether a fire actually occurs when a suspected fire event occurs using a multiwavelength-based photoelectric smoke detection apparatus.

2. Discussion of Related Art

Fire detectors are devices for determining whether a fire occurs by detecting heat and smoke generated during the fire. Fire detectors include heat detection-type fire detectors and smoke detection-type fire detectors. The heat detection-type fire detectors include constant temperature-type fire detectors which detect a fire when an ambient temperature of a detector rises a predetermined level or more, and differential-type fire detectors which operate when a temperature increment rate exceeds a threshold value. The smoke detection-type fire detectors include ionization-type fire detectors which measure a change of an ion current value due to smoke, and photoelectric-type fire detectors which detect light scattering due to smoke particles.

Meanwhile, the use of photoelectric fire detectors for rapid detection of fire has recently been increasing. The photoelectric fire detector has a structure in which smoke is introduced into a chamber inside the detector, and when light is scattered due to the introduced smoke particles, the scattered light is detected and a fire alarm is generated.

However, the conventional photoelectric fire detector has a problem of frequently generating non-fire alerts by determining a fire and generating an alarm even if, in addition to actual smoke, any particle which occurs in everyday life not from a fire is introduced. (for example cooking smoke, cigarette smoke, water vapor, fine dust, etc.)

Due to false alarms caused by such non-fire alerts, the fire department may be dispatched by mistake, wasting administrative power, and ordinary people may fail to respond appropriately when an alarm occurs. In some cases, fire receivers are even turned off to avoid false alarms, and thus there is a problem in that the smoke receivers fail to activate in the event of a real fire, causing serious personal and property damage.

SUMMARY OF THE INVENTION

The present invention is directed to reducing non-fire alerts by distinguishing smoke caused by actual fire occurrence and non-fire smoke occurring in daily life when a suspected fire event occurs.

According to an aspect of the present invention, there is provided a multiwavelength photoelectric smoke detection apparatus including a chamber in which a smoke inlet is formed, a light emitter configured to generate light with multiple wavelengths, a light receiver configured to detect scattered light due to smoke particles, a controller configured to turn a light source of the light emitter on and off and detect a scattered light signal from the light receiver; and a fire determination part configured to determine whether an amplitude of the detected scattered light signal exceeds a threshold value and generate an alarm.

According to another aspect of the present invention, there is provided a smoke detection method executed in the multiwavelength photoelectric smoke detection apparatus, which includes detecting, by a light receiver, scattered light, which is light with multiple wavelengths emitted from a light emitter and scattered due to smoke particles, and acquiring multiwavelength signals; receiving, by a processor including at least one of a controller and a fire determination part, a scattered light signal and normalizing a plurality of measured wavelength values of the scattered light to calculate normalized values; calculating, by the processor, a singular value which is a criterion for determining whether smoke generated after the normalization is caused by a fire; determining, by the processor, whether the sum of the normalized values with respect to the scattered light reaches a predetermined threshold value; and when the sum reaches the predetermined threshold value, determining, by the processor, a fire or a non-fire using the calculated singular value.

The details of other exemplary embodiments of the present invention are included in the detailed description and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. Terms used herein are for the purpose of describing the embodiments of the present invention and are not intended to limit the present invention. In the present specification, the singular forms include the plural forms unless the context clearly dictates otherwise. The term "comprise" or "comprising" used herein does not preclude the presence or addition of one or more other elements, steps, operations, and/or devices other than stated elements, steps, operations, and/or devices.

First, in order to facilitate understanding of the present invention, the background of the present invention will be described first and then embodiments of the present invention will be described in detail.

Figures 1A, 1B:
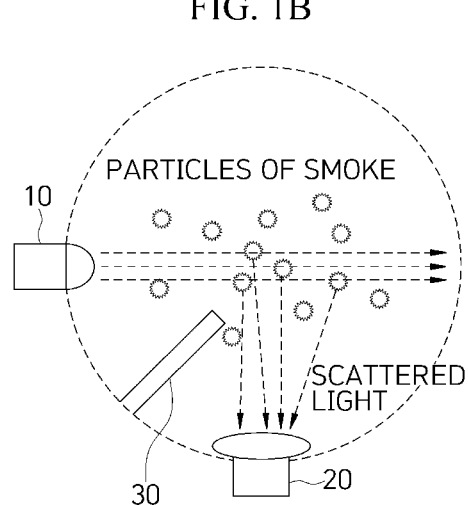
FIG. 1A is a schematic diagram for describing the principle of a conventional photoelectric fire detector.
FIG. 1B is a schematic diagram for describing an operation of the detector when smoke particles are introduced into the conventional photoelectric fire detector.

FIG. 1A is a schematic diagram for describing a conventional photoelectric fire detector. FIG. 1B is a diagram for describing an operation of the detector when smoke particles are introduced in the conventional photoelectric fire detector.

According to FIG. 1A, the conventional photoelectric fire detector includes a light emitter 10 formed of a light-emitting diode (LED) or a laser, and a light receiver 20 formed of a photodetector such as a photodiode and has a structure in which, in a chamber, the light emitter 10 and the light receiver 20 are disposed to be offset to maintain a predetermined angle therebetween or a light blocking wall 30 is installed, and thus light from the light emitter 10 is not detected by the light receiver 20, in a normal environment that the smoke particles are not introduced.

FIG. 1B shows a case in which smoke particles are introduced into the chamber of the detector. The light emitted from the light emitter 10 is scattered due to the smoke particles, the scattered light is incident on the light receiver 20, and thus the light receiver 20 responds. That is, an alarm is generated when the scattered light due to the smoke particles is detected by a light receiving element of the light receiver 20 and an amplitude of the detected signal gradually increases to exceed a set threshold value for alarm generation.

Figure 1C:
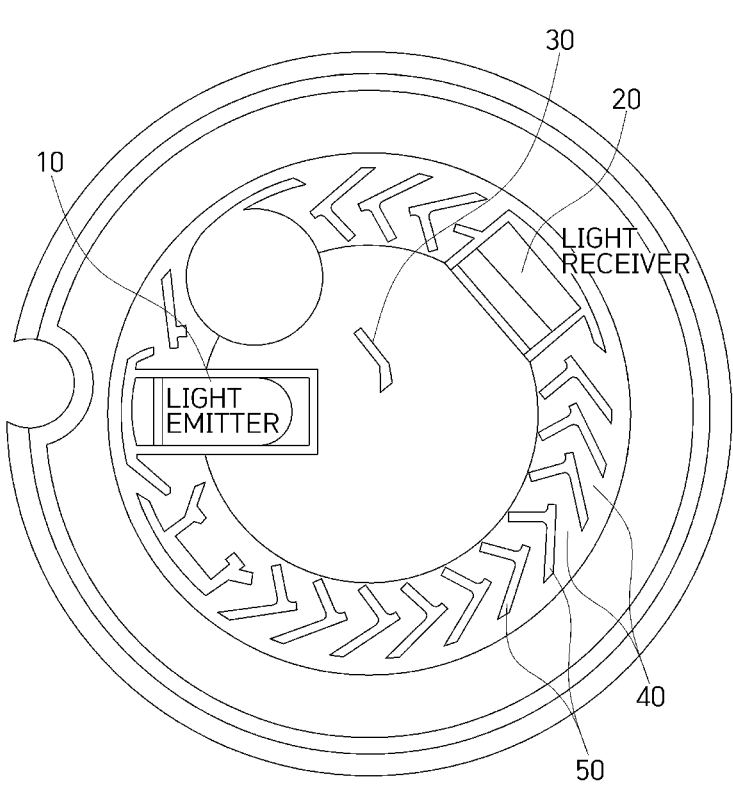
FIG. 1C is a diagram illustrating an example of an actual shape of an internal structure of a chamber of the conventional photoelectric fire detector shown in FIGS. 1A and 1B.

FIG. 1C is a diagram illustrating an example of an actual shape of an internal structure of a chamber of the conventional photoelectric fire detector shown in FIGS. 1A and 1B. It can be seen that the light emitter 10 and light receiver 20 are disposed to be offset and the light blocking wall 30 is therebetween. A number of smoke inlets 40 are formed along a circumference of the chamber to facilitate an inflow of smoke from the outside into the chamber, and are each formed in a structure of a labyrinth 50 to prevent external light from entering therein and interfering with the light receiver 20.

Since such a conventional photoelectric fire detector responds to particles in an aerosol state, there is a problem in that the conventional photoelectric fire detector responds to smoke due to, in addition to a real fire, everyday life smokes (such as cooking smoke, cigarette smoke, water vapor, and fine dust). Thus, it frequently generates non-fire alerts.

In order to solve the above problem, it is an object of the present invention to distinguish fire smoke from non-fire smoke similar to fire smoke using a plurality of wavelength characteristics.

Figure 2:
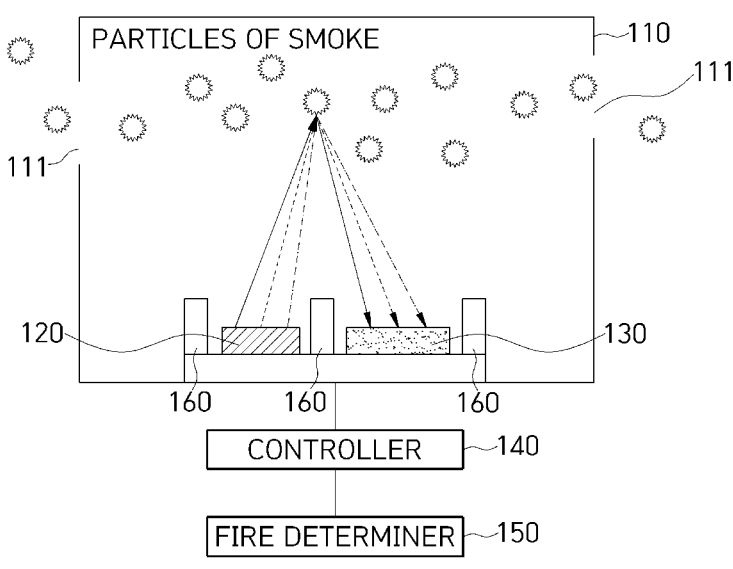
FIG. 2 is a schematic block diagram illustrating a multiwavelength photoelectric smoke detection apparatus (100) according to one embodiment of the present invention.

FIG. 2 is a schematic diagram illustrating a multiwavelength photoelectric smoke detection apparatus 100 according to one embodiment of the present invention.

The illustrated smoke detection apparatus 100 includes: a chamber 110 in which smoke inlets 111 are formed; a light emitter 120 for generating light with multiple wavelengths; a light receiver 130 for detecting scattered light due to smoke particles; a controller 140 for turning on and off a light source of the light emitter 120 and detecting a scattered light signal from the light receiver 130; and a fire determination part 150 for determining whether a amplitude of the detected scattered light signal exceeds a threshold value and generating an alarm. In addition, a light blocking wall 160 is provided between the light emitter 120 and the light receiver 130 to prevent light from being directly transmitted therebetween and to surround the light emitter 120 and the light receiver 130 to block interference of external light. Hereinafter, the multiwavelength light emitter 120, the multiwavelength light receiver 130, and the light blocking wall 160 will be collectively referred to as a sensor package.

In FIG. 2, the controller 140 and the fire determination part 150 are shown separately to describe their functions, but in actual implementation, they may be integrated into one physical area. For example, the controller 140 and the fire determination part 150 may be implemented as a computer hardware and software-based processor or a microcomputer.

Figure 3:
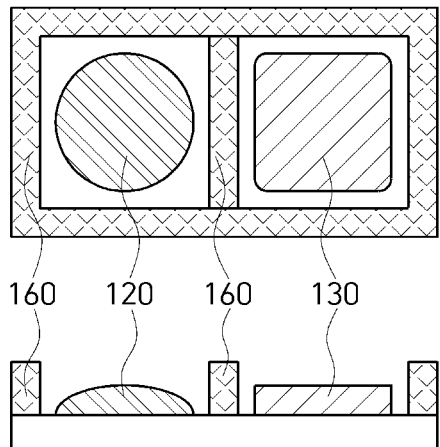
FIG. 3 is a schematic diagram illustrating a sensor package formed of a multiwavelength light emitter (120), a multiwavelength light receiver (130), and a light blocking wall (160) among components of FIG. 2, when viewed from the top and the front.

FIG. 3 is a schematic diagram illustrating the sensor package formed of the multiwavelength light emitter 120, the multiwavelength light receiver 130, and the light blocking wall 160 among the components of FIG. 2, viewing from the top and the front. The multiwavelength light emitter 120 and the multiwavelength light receiver 130 are positioned adjacent to each other on the same surface. The multiwavelength light emitter 120 emits light with multiple wavelengths, and the multiwavelength light receiver 130 has a wavelength detection characteristic that responds to the emitted light with multiple wavelengths.

The light blocking wall 160 between the multiwavelength light emitter 120 and the multiwavelength light receiver 130 blocks interference in order for the multiwavelength light receiver 130 not to detect a light emitted from the multiwavelength light emitter 120 in direct rather than as a scattered light. In addition, a light blocking wall 160 surrounding the package may prevent interference due to external light. Referring to a lower side of FIG. 3 (a cross-sectional view), it can be seen that the highest portions of the light emitter 120 and the light receiver 130 are below the heights of the light blocking walls 160. In this way, the light emitter 120 and the light receiver 130 should be positioned below (at least at the same height as) the light blocking wall 160 to achieve the purpose of the light blocking wall 160 for preventing the interference due to the external light.

In one embodiment, four light-emitting elements of the multiwavelength light emitter 120 emit light with four wavelengths $\lambda_1$ to $\lambda_4$, and a first wavelength $\lambda_1$ may be about 450 nm±50 nm, a second wavelength $\lambda_2$ may be about 550 nm±50 nm, a third wavelength $\lambda_3$ may be about 650 nm±50 nm, and a fourth wavelength $\lambda_4$ may be about 950 nm±50 nm. In addition, a photodiode PD of the multiwavelength light receiver 130 may receive light with wavelengths in the range of about 400 nm to 1000 nm in order to detect the multiple wavelengths, and in some cases, the multiwavelength light receiver 130 may be formed of a plurality of photodiodes to cover a wide range of wavelengths.

Figure 4:
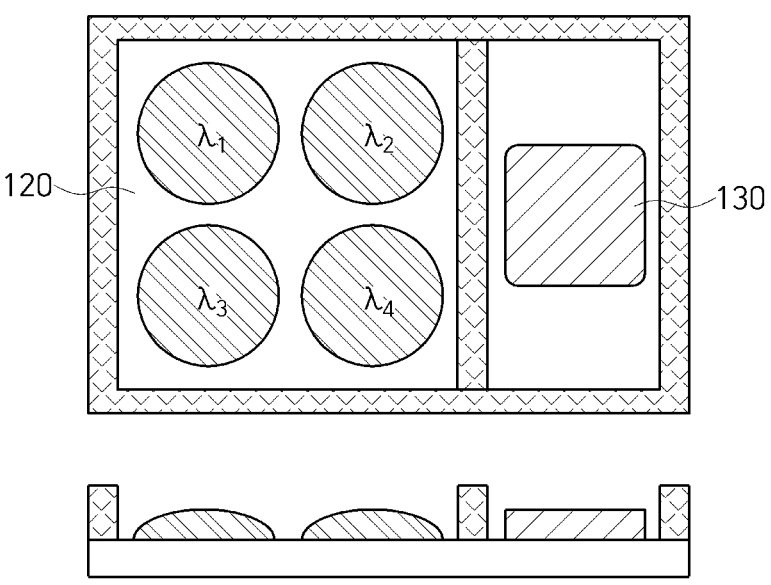
FIG. 4 is a schematic diagram illustrating one embodiment of the present invention.
Figure 5:
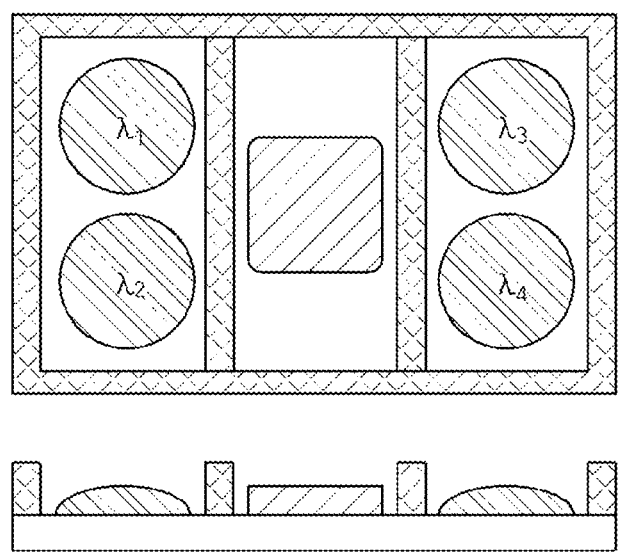
FIG. 5 is a schematic diagram illustrating another embodiment of the present invention.
Figure 6:
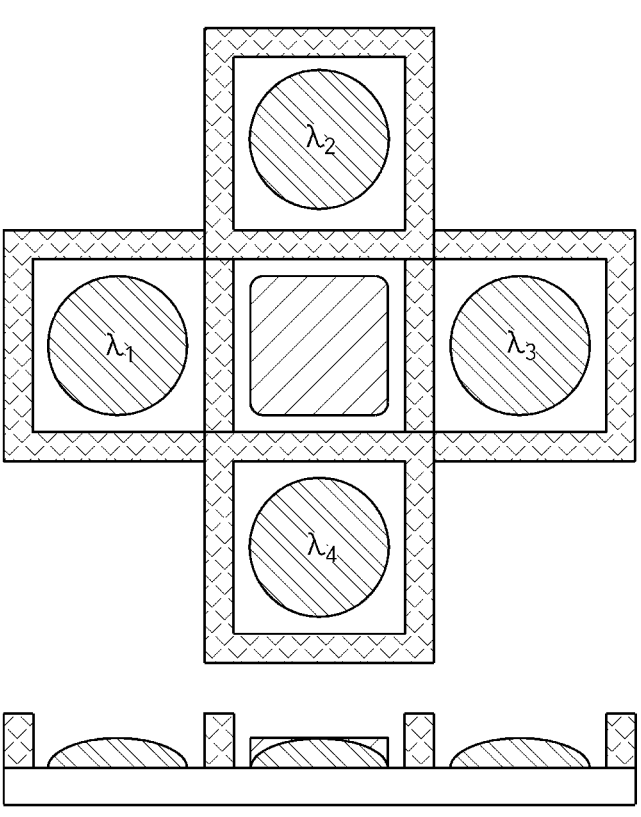
FIG. 6 is a schematic diagram illustrating still another embodiment of the present invention.

In order for the multiwavelength light emitter 120 to emit multiple wavelengths, four independent LED products may be used as the light-emitting elements, or one LED product in which four light-emitting chips are integrated in one LED mold may be used. FIGS. 4, 5, and 6 show an example in which the multiwavelength light emitter 120 includes four light-emitting elements (e.g., LEDs) emitting light with four wavelengths, and the multiwavelength light receiver 130 includes one light receiving element (e.g., a PD).

FIG. 4 shows an embodiment that the multiwavelength light emitter 120 and the multiwavelength light receiver 130 are disposed on the same surface, and the multiwavelength light emitter 120 is implemented in the form in which the four light-emitting elements emitting light with four wavelengths $\lambda1$, $\lambda2$, $\lambda3$, and $\lambda4$ independently are densely disposed in one place. Here, the order of wavelengths may be changed and arranged differently from that shown in the drawing.

As another embodiment, FIG. 5 shows that the multiwavelength light emitter 120 and the multiwavelength light receiver 130 are disposed on the same surface, and the form of the multiwavelength light emitter 120 in which some (two) light-emitting elements (emitting $\lambda1$ and $\lambda2$) are disposed on one side of the multiwavelength light receiver 130 and the remaining light-emitting elements (emitting $\lambda3$ and $\lambda4$) are disposed on the other side opposite to the one side (on left and right sides in FIG. 5) to emit light with four wavelengths. This combination order of wavelengths may also be changed and arranged differently from that shown in the drawing.

As still another embodiment, FIG. 6 shows that the multiwavelength light emitter 120 and the multiwavelength light receiver 130 are disposed on the same surface, and the multiwavelength light emitter 120 has a form in which the light-emitting elements emitting $\lambda1$, $\lambda2$, $\lambda3$ and $\lambda4$ are disposed at a first side of the multiwavelength light receiver 130, at a second side positioned at an angle of approximately 90° with respect to the first side, at a third side positioned at an angle of approximately 90° with respect to the second side, and at a fourth side positioned at an angle of approximately 90° with respect to the third side, respectively. This combination order of wavelengths may also be changed and arranged differently from that shown in the drawing.

In order to detect smoke in a photoelectric smoke detector, smoke from the outside should smoothly approach a light source to generate scattering. To this end, the structure of the labyrinth 50 is employed to allow only smoke to flow in while blocking external light.

Figure 7:
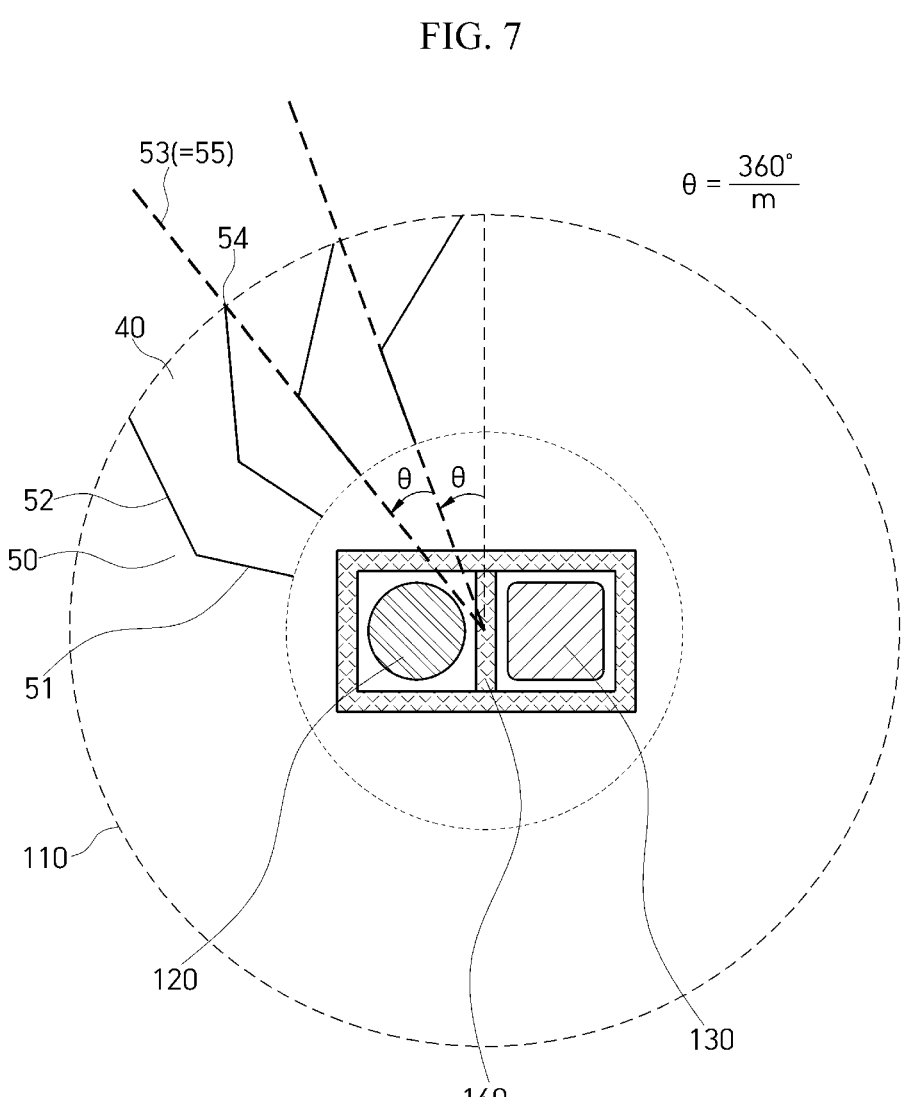
FIG. 7 is an explanatory view illustrating the shape of a labyrinth (50)

FIG. 7 is a diagram for describing the shape of a labyrinth 50 when the sensor package is disposed at the center of the multiwavelength smoke detection apparatus 100 in the multiwavelength photoelectric smoke detection apparatus according to the present invention. The labyrinth 50 may have a bent shape at one or more portions due to its structural characteristics (FIG. 7 shows a bent shape at only a single portion). In addition, the number of labyrinths 50 may be adjusted according to the overall size of the smoke inlets 40 relative to the circumference of the chamber 110.

In the labyrinth 50, regardless of the number of bent portions, an angle of the closest portion of the labyrinth 50 to the sensor package (i.e., a first portion 51 closest to the sensor package) is important. When the total number of labyrinths 50 is m, the angle of the first portion 51 of the first labyrinth 50 with respect to a central axis of the smoke detection apparatus 100 is set as θ=360°/m. Then, m−1 labyrinths 50 that are an adjacent second labyrinth to m-th labyrinth are added and disposed at intervals of θ.

In addition, the role of the labyrinth 50 is to prevent external light from entering the chamber 110 while allowing outside smoke to enter the chamber 110. Therefore, the bent angle of the labyrinth 50 is important. In FIG. 7, an angle of a second portion 52 bent and connected to the first portion 51 serves the above role. That is, in order to prevent external light 53 from being radiated onto the sensor package, an outer end portion of the second portion 52 should be bent more toward a corresponding adjacent labyrinth 50 than an extension line 55 of the first portion 51 of the corresponding adjacent labyrinth 50.

Hereinafter, the principle of non-fire discrimination in the above-described multiwavelength photoelectric smoke detection apparatus 100 when a suspicious fire event occurs will be described. Hereinafter, for convenience of understanding, a description will be made by assuming that the number n of wavelengths is four.

Figure 8A:
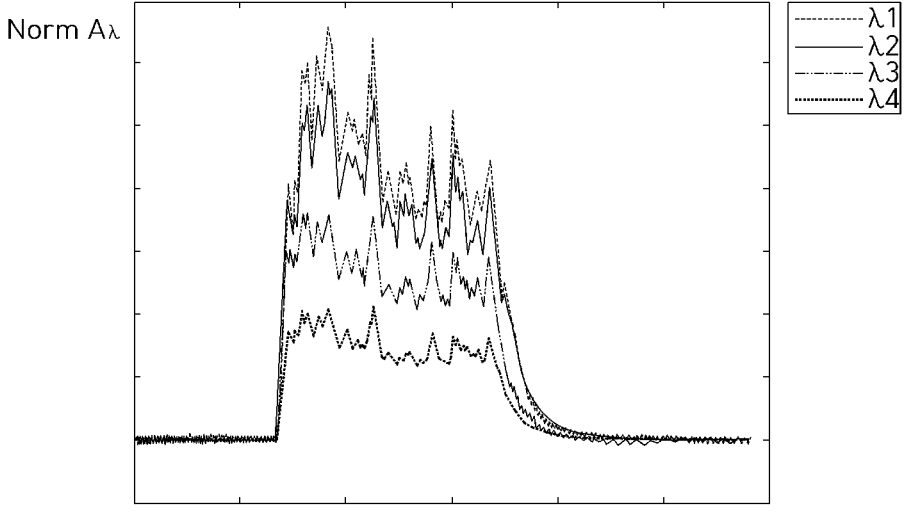
FIGS. 8A and 8B show exemplary diagrams illustrating radiation wavelengths and normalized values of the multiwavelength light emitter (120)
Figure 8B:
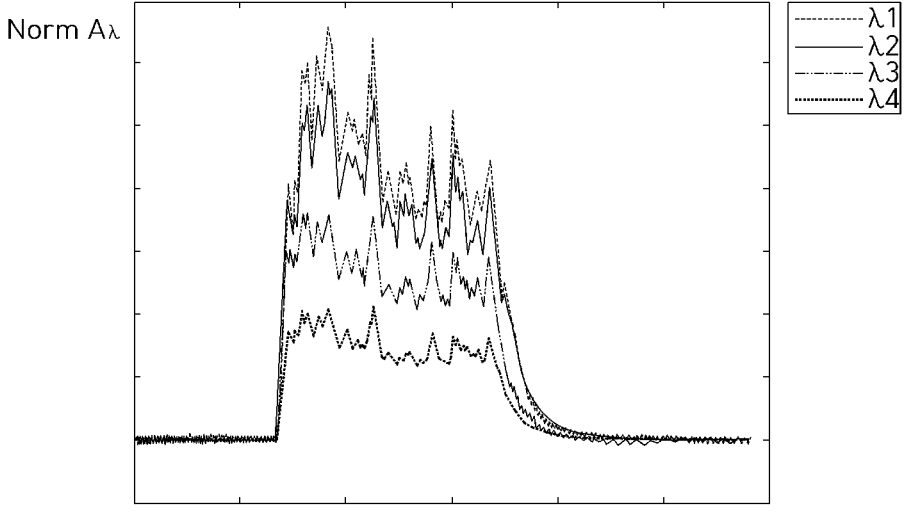

FIGS. 8A and 8B show exemplary graphs illustrating outputs of n (four) light-emitting sources constituting the multiwavelength light emitter 120 as signal intensities I (a left graph) and normalized amplitude values Norm A_λ (a right graph) with respect to wavelengths. The left graph shows signal intensities of four wavelengths, and the right graph shows four normalized amplitude values Norm A_λ calculated by normalizing four measured values acquired by the multiwavelength light receiver 130 detecting scattered light for each wavelength. These normalized amplitude values Norm A_λ are obtained by normalizing values measured by the multiwavelength light receiver 130 with respect to scattered light due to smoke particles on the basis of values measured by the multiwavelength light receiver 130 in the absence of the smoke particles.

The normalized amplitude values Norm A_λ may be as expressed in the following Equation 1.

$$Norm\ A_\lambda = \begin{bmatrix} Norm\ A_1 \\ Norm\ A_2 \\ Norm\ A_3 \\ Norm\ A_4 \end{bmatrix} \qquad \text{[Equation 1]}$$

Figure 9:
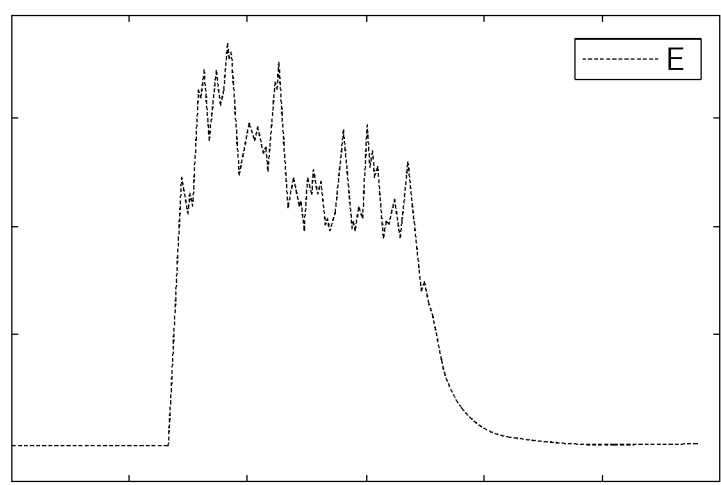
FIG. 9 is a diagram illustrating E values.

A value E of the sum of Norm $A_1$, Norm $A_2$, Norm $A_3$, and Norm $A_4$ in Equation 1 is expressed in the following Equation 2. In addition, the value E is shown in FIG. 9. Occurrence of a suspected fire event may be determined by comparing the value E of the sum of n (=4) normalized amplitude values Norm A_λ with respect to the scattered light with a threshold value.

$$E = \sum_{\lambda=1}^{4} Norm\ A_\lambda = Norm\ A_1 + Norm\ A_2 + Norm\ A_3 + Norm\ A_4 \qquad \text{[Equation 2]}$$

However, by using the normalized amplitude values Norm A_λ in Equation 1 and the value E in Equation 2, it is possible to determine whether a suspicious fire event occurs due to smoke particles introduced into the chamber, but it is not possible to distinguish whether the smoke is caused by a real fire or by a cause other than fire. Therefore, according to the present invention, a mathematical algorithm for deriving a singular value to distinguish a fire and a non-fire from Equation 1 is proposed.

In Equation 3, $d_{ij}$ is obtained by calculating a size difference between elements in Equation 1, and D denotes a matrix representing the size difference $d_{ij}$ between the elements.

$$D = \begin{bmatrix} d_{11} & d_{12} & d_{13} & d_{14} \\ d_{21} & d_{22} & d_{23} & d_{24} \\ d_{31} & d_{32} & d_{33} & d_{34} \\ d_{41} & d_{42} & d_{43} & d_{44} \end{bmatrix} \qquad \text{[Equation 3]}$$

Here, $d_{ij}$=|Norm $A_i$−Norm $A_j$|i,j=1, 2, 3, 4

In Equation 3, $d_{ij}$ is a distance value corresponding to correlation (similarity) between the elements of Equation 1. That is, the matrix D (first matrix) includes n×n elements $d_{ij}$ representing similarity between n normalized amplitude values Norm A_λ with respect to the scattered light.

Equation 4 represents a matrix S (second matrix) obtained by calculating $s_{ij}$ using each matrix element value of the matrix D obtained in Equation 3 with respect to four wavelengths (n=4).

$$S = \begin{bmatrix} s_{11} & s_{12} & s_{13} & s_{14} \\ s_{21} & s_{22} & s_{23} & s_{24} \\ s_{31} & s_{32} & s_{33} & s_{34} \\ s_{41} & s_{42} & s_{l3} & s_{44} \end{bmatrix} \qquad \text{[Equation 4]}$$

$$\text{Here, } s_{ij} = -\frac{1}{2}\left[ d_{ij}^2 - \frac{1}{n}\sum_{q=1}^{n} d_{iq}^2 - \frac{1}{n}\sum_{p=1}^{n} d_{pj}^2 + \frac{1}{n^2}\sum_{g=1}^{n}\sum_{h=1}^{n} d_{gh}^2 \right].$$

The matrix S of Equation 4 is a matrix whose elements are $s_{ij}$ calculated using each element value of the matrix D calculated in Equation 3 with respect to the four wavelengths (n=4). When broadly interpreted, the matrix S may be defined as a matrix for deriving an optimal distribution with respect to the elements $d_{ij}$ of the matrix D at each wavelength through a combination of the elements $d_{ij}$ of the matrix D.

Equation 5 represents an eigenvector v with respect to the matrix S of Equation 4.

$$Sv=\lambda v \qquad \text{[Equation 5]}$$

In Equation 5, $\lambda$ denotes an eigenvalue of the matrix S of Equation 4; and v denotes an eigenvector with respect to the eigenvalue $\lambda$ of the matrix S. That is, a column vector v, which satisfies $Sv=\lambda v$ with respect to an n×n square matrix S and is not zero, is defined as an eigenvector; and a constant $\lambda$ is defined as an eigenvalue.

The eigenvector may be expressed as a matrix including four elements $v_1$, $v_2$, $v_3$, and $v_4$ divided into four wavelengths in the following Equation 6. The mathematical definitions of the eigenvalue and the eigenvector are well known in linear algebra, and thus detailed description thereof will be omitted.

$$v = \begin{bmatrix} v_1 \\ v_2 \\ v_3 \\ v_4 \end{bmatrix} \qquad \text{[Equation 6]}$$

Figure 10:
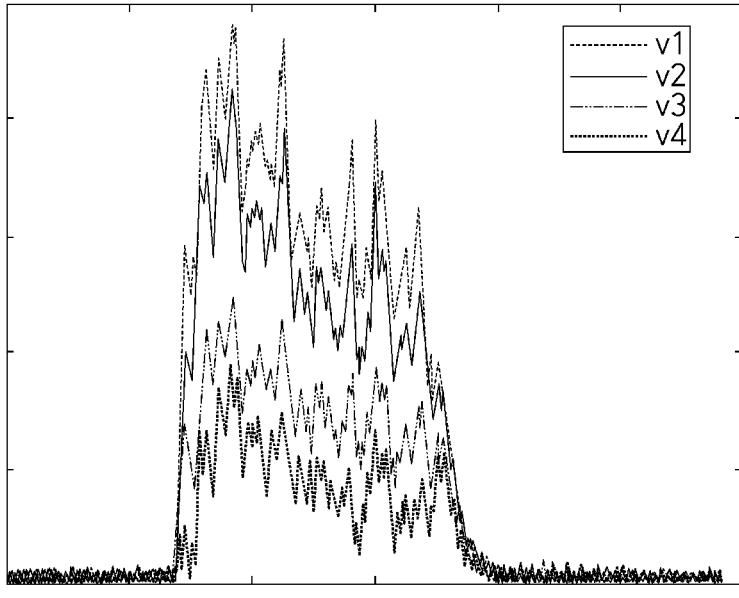
FIG. 10 is a diagram illustrating singular values derived from the normalized values of FIG. 8B.

FIG. 10 shows each element (a singular value) of the eigenvector of Equation 6 obtained by calculating the normalized signals shown on FIG. 8B by using Equations 3-5. In the present invention, singular values may be eigenvectors v1, v2, v3, and v4, which may be represented as a graph shown in FIG. 10. Here, since an example of scattered light measured at each of the four wavelengths is described, four eigenvectors are calculated. Therefore, n eigenvectors may be calculated from scattered light measured at n wavelengths.

Figure 11A:
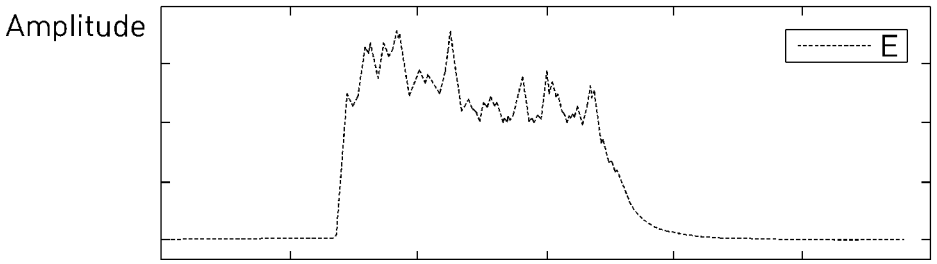
FIGS. 11A and 11B show diagrams illustrating amplitudes and angles of the E values of FIG. 9
Figure 11B:
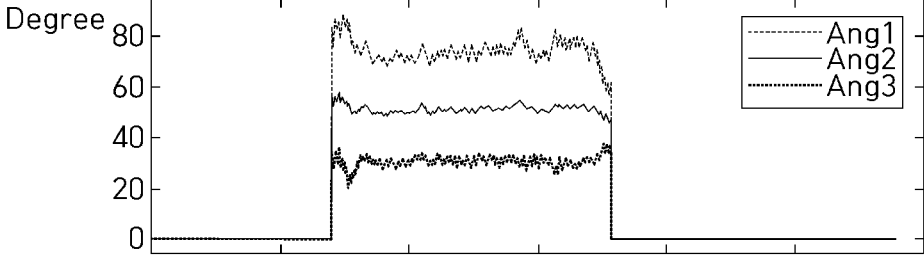

Now, in order to distinguish a fire and a non-fire, a fire determination conditional expression is obtained by combining values of the elements, which are the singular values, that is, the eigenvectors v1, V2, V3, and v4. For example, angles Ang formed by a ratio of the singular values may be calculated as follows. In the following Equation 7, each of Ang1, Ang2, and Ang3 is a value representing a ratio of the eigenvectors $v_1$, $v_2$, $v_3$, and $v_4$ in the form of an angle and may be represented as a graph shown in FIGS. 11A and 11B. FIG. 11A shows an amplitude of the value E of FIG. 9 and FIG. 11B shows angles (in degrees) calculated by the following Equations 7 to 9.

$$Ang1 = \tan^{-1}\left(\frac{v_4}{v_1}\right) \qquad \text{[Equation 7]}$$

$$Ang2 = \tan^{-1}\left(\frac{v_4}{v_3}\right) \qquad \text{[Equation 8]}$$

$$Ang3 = \tan^{-1}\left(\frac{v_2}{v_1}\right) \qquad \text{[Equation 9]}$$

As described above, the fire determination conditional expression using the singular values is not limited to Equation 7 and may be derived from various combination values of the singular values according to Equation 6. For example, it is possible to determine fire occurrence, by summing all of the singular values v1, v2, v3, and v4 or comparing a threshold value with a result value obtained by multiplying all of the singular values v1, v2, v3, and v4. Alternatively, it is possible to determine whether a fire occurs by calculating similarity between the singular values v1, v2, v3, and v4 and comparing the similarity with a threshold value. Alternatively, it is possible to determine whether a fire occurs by comparing difference values between the singular values v1, v2, v3, and v4 with a threshold value. Alternatively, it is possible to determine whether a fire occurs by comparing an average value of the singular values v1, v2, v3, and v4 with a threshold value.

Figure 12:
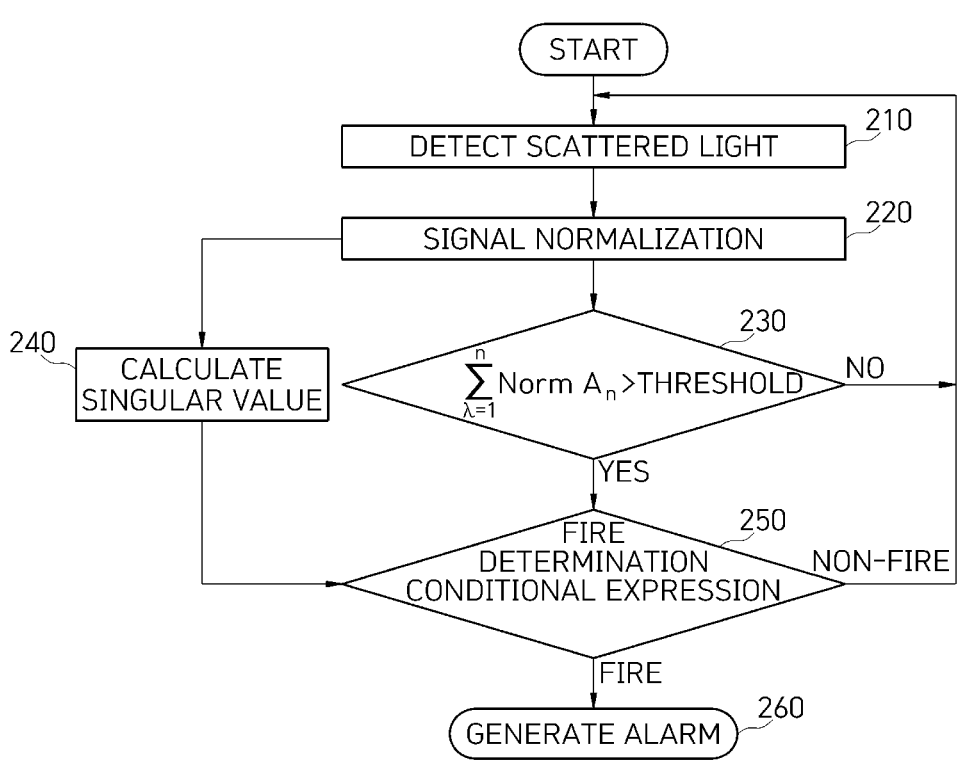
FIG. 12 is a flowchart illustrating a multiwavelength photoelectric fire detection method according to the present invention.

FIG. 12 is a flowchart illustrating a process of a fire detection method of distinguishing a fire and a non-fire by deriving a singular value with respect to a scattered light signal detected by the above-described multiwavelength photoelectric fire detection apparatus according to the present invention. Since the process proceeds in the same order as described above for the principle of the present invention, the process will be briefly described. As described above, the process of FIG. 12 may be performed on a hardware and software basis by a computer-based processor in which the controller 140 and/or the fire determination part 150 of FIG. 2 are implemented.

First, a scattered light signal is detected (210). The scattered light signal detection is a process in which the light receiver 130 detects scattered light with n wavelengths, which is emitted from the light emitter 120 and scattered due to smoke particles, and acquires n wavelength signals, and the processor receives the n wavelength signals.

Subsequently, the processor normalizes the received scattered light signal (220). This normalization is a process of normalizing n measured wavelength values with respect to the scattered light and calculating n normalized values Norm A_λ (see the description related to Equation 1).

Then, the processor determines whether the sum of the n normalized values Norm A_λ with respect to the scattered light (E of Equation 2) exceeds a predetermined threshold value. This is an operation of determining whether a suspicious fire event occurs (230).

Meanwhile, in separation from operation 230, the processor calculates the above-described singular values after the normalization in operation 220 (240). The singular values are calculated according to the description related to Equations 3 to 6 and FIG. 10. In the present invention, the singular values are criteria for determining whether generated smoke is caused by a fire.

When a suspicious fire event is determined to occur through the repeated determination of operation 230, the processor determines a fire or a non-fire by applying the calculated singular values and the fire determination conditional expression described in Equation 7 and with reference to FIGS. 11A and 11B (250).

When it is determined that smoke introduced into the chamber is caused by a fire, a fire alarm is issued (260). Here, the fire alarm may be output in the form of visual or/and audible information.

Figure 13:
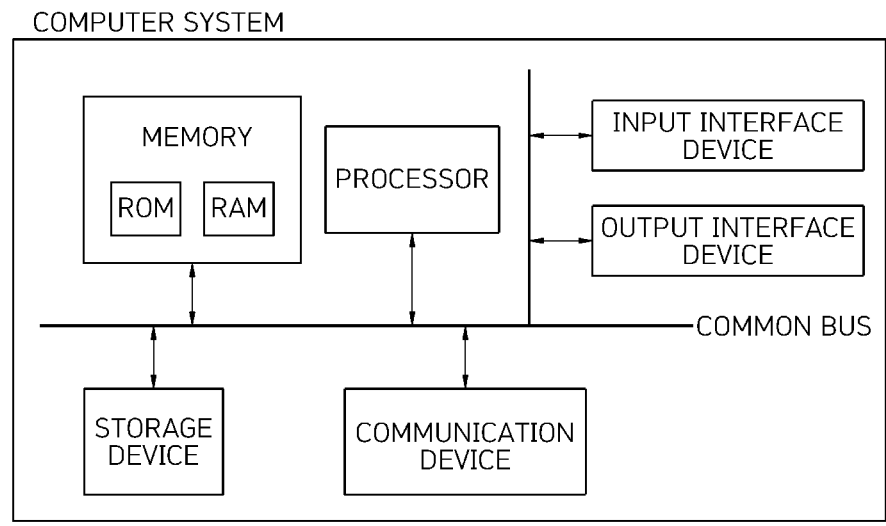
FIG. 13 is a block diagram illustrating a computer system which is the basis of a processor and a software algorithm of the present invention.

The above-described processor and software algorithm of the present invention may be implemented based on a computer system shown in FIG. 13.

The computer system shown in FIG. 13 may include at least one among a processor, a memory, an input interface device, an output interface device, and a storage device, which communicate with each other through a common bus. The computer system may also include a communication device coupled to a network. The processor may be a central processing unit (CPU) or a semiconductor device which executes commands stored in the memory or the storage device. The communication device may transmit or receive a wired signal or a wireless signal. The memory and the storage device may include various forms of volatile or nonvolatile storage media. In addition, the memory may include a read only memory (ROM) and a random access memory (RAM). The memory may be positioned inside or outside the processor and may be connected to the processor through various known parts.

Therefore, the present invention may be implemented as a method implemented in a computer or as a non-transitory computer-readable medium in which computer-executable commands are stored. When an embodiment is executed by the processor, computer readable commands may perform a method according to at least one aspect described herein.

In addition, the method according to the present invention may be implemented in the form of a program command which is executable through various computer means and recorded in a computer-readable medium. The computer-readable medium may include program commands, data files, data structures, and the like alone or in a combination thereof. The program commands recorded in the computer-readable medium may be specially designed and configured for the present invention or may be available to those skilled in computer software. Computer-readable recording media may include hardware devices configured to store and execute program commands. For example, the computer-readable recording media may include magnetic media such as a hard disk, a floppy disk, and a magnetic tape, optical recording media such as a compact disc read only memory (CD-ROM) and a digital versatile disc (DVD), a magneto-optical medium such as a floptical disk, a ROM, a RAM, a flash memory, and the like. The program commands may include machine language codes generated by a compiler, as well as high-level language codes which are executable by a computer using an interpreter or the like.

In accordance with the present invention, a smoke detection device and method with a function of distinguishing a fire and a non-fire can reduce false alarms due to non-fire alerts caused by everyday life smoke and prevent firefighters from being dispatched due to the false alarms in advance, thus increasing reliability of fire alarms to the public.

The embodiments implementing the spirit of the present invention have been described in detail. However, the technical scope of the present invention is not limited to the above-described embodiments and the accompanying drawings and is determined by reasonable interpretation of the appended claims.

What is claimed is:

1. A multiwavelength photoelectric smoke detection apparatus comprising:
   a chamber in which a smoke inlet is formed;
   a light emitter configured to generate light with multiple wavelengths;
   a light receiver configured to detect scattered light due to smoke particles;
   a controller configured to turn a light source of the light emitter on and off and detect a scattered light signal from the light receiver; and
   a fire determination part configured to determine whether an amplitude of the detected scattered light signal exceeds a threshold value and generate an alarm;
   wherein the light emitter is formed such that light-emitting elements configured to emit light with wavelengths included among the multiple wavelengths are divided and positioned
   at a first side of the light emitter,
   at a second side positioned at an angle of 90° with respect to the first side,
   at a third side positioned at an angle of 90° with respect to the second side, and
   at a fourth side positioned at an angle of 90° with respect to the third side;
   wherein a space defined by each angle of 90° is bordered by a light blocking wall; and
   wherein the fire determination part normalizes measured values of the scattered light to calculate normalized values and calculates singular values in order to determine whether smoke is caused by a fire or a non-fire from the normalized values, wherein the calculating of the singular values comprises:
   calculating a first matrix (D) including elements representing a similarity between the normalized values;
   calculating a second matrix (S) for deriving a distribution of the elements of the first matrix (D) at each wavelength; and
   calculating eigenvectors of the second matrix (S), the singular values including the eigenvectors.

2. The multiwavelength photoelectric smoke detection apparatus of claim 1, wherein the light blocking wall is configured to prevent light from being directly transmitted between the light emitter and the light receiver and surround the light emitter and the light receiver to block interference of external light.

3. The multiwavelength photoelectric smoke detection apparatus of claim 1, wherein the light emitter and the light receiver are positioned on a same surface.

4. The multiwavelength photoelectric smoke detection apparatus of claim 3, wherein the light emitter is formed such that all light-emitting elements configured to emit light with wavelengths included among the multiple wavelengths are positioned at one side of the light receiver.

5. The multiwavelength photoelectric smoke detection apparatus of claim 3, wherein the light emitter is formed such that light-emitting elements configured to emit light with wavelengths included among the multiple wavelengths are divided and positioned at one side of the light receiver and at another side opposite to the one side.

6. The multiwavelength photoelectric smoke detection apparatus of claim 1, wherein the light emitter and the light receiver are positioned at a same height as the light blocking wall or lower.

7. The multiwavelength photoelectric smoke detection apparatus of claim 1, wherein the light emitter includes one light-emitting element in which a plurality of chips are integrated.

8. The multiwavelength photoelectric smoke detection apparatus of claim 1, wherein the chamber further includes a labyrinth configured to block external light from entering the smoke inlet.

9. The multiwavelength photoelectric smoke detection apparatus of claim 8, wherein:
the labyrinth includes a first portion facing the light emitter and the light receiver, and a second portion connected to the first portion at an angle; and
an angle of the first portion with respect to the light emitter and light receiver is 360°/the number of laby-rinths.

10. The multiwavelength photoelectric smoke detection apparatus of claim 8, wherein:
the labyrinth includes a first portion facing the light emitter and the light receiver, and a second portion connected to the first portion at an angle; and
an outer end portion of the second portion is bent more toward a corresponding adjacent labyrinth than an extension line of a first portion of an adjacent labyrinth.

11. The multiwavelength photoelectric smoke detection apparatus of claim 1, wherein:
a singular value is a vector; and
the fire determination part generates a fire determination conditional expression using an angle value formed by a ratio between values of elements of the singular value vector in order to distinguish a fire and a non-fire.

12. A smoke detection method executed in the multiwavelength photoelectric smoke detection apparatus of claim 1, the smoke detection method comprising:
detecting, by the light receiver, the scattered light, which is light with multiple wavelengths emitted from the light emitter and scattered due to smoke particles, and acquiring multiwavelength signals;
receiving, by a processor including at least one of the controller and the fire determination part, the scattered light signal;
calculating, by the processor, a singular value which is a criterion for determining whether smoke generated after the normalization is caused by a fire;
determining, by the processor, whether a sum of the normalized values with respect to the scattered light reaches a predetermined threshold value; and
when the sum reaches the predetermined threshold value, determining, by the processor, a fire or a non-fire using the calculated singular value.

13. The smoke detection method of claim 12, wherein:
the singular value is a vector; and
the smoke detection method further includes generating, by the fire determination part, a fire determination conditional expression using an angle value formed by a ratio between values of elements of the singular value vector in order to distinguish a fire and a non-fire.

* * * * *